(12) United States Patent
Yamamoto et al.

(10) Patent No.: US 6,226,236 B1
(45) Date of Patent: May 1, 2001

(54) INFORMATION DATA TRANSFER SYSTEM

(75) Inventors: Koji Yamamoto; Mitsuaki Yamashita, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/023,305

(22) Filed: Feb. 13, 1998

(30) Foreign Application Priority Data

Feb. 15, 1997 (JP) .................................................... 9-047062

(51) Int. Cl.[7] .................................................. G11B 17/22
(52) U.S. Cl. ....................... 369/32; 369/47.15; 369/59.01
(58) Field of Search ..................... 369/32, 53.2, 59.1, 369/60.01, 47.15, 47.36, 47.16, 47.1

(56) References Cited

U.S. PATENT DOCUMENTS

| 4,996,679 | * | 2/1991 | Yoshio | 369/33 |
| 5,526,328 | * | 6/1996 | Oshima et al. | 369/13 |
| 5,793,724 | * | 8/1998 | Ichikawa et al. | 369/60 |

* cited by examiner

*Primary Examiner*—Ali Neyzari
(74) *Attorney, Agent, or Firm*—Oblon, Spivak, McClelland, Maier & Neustadt, P.C.

(57) ABSTRACT

An information data transferring system comprising a circuit for reading information data as reproduction data and sub-code data and demodulating the read data, a circuit for subjecting the information data to an error correction process, a circuit for generating a track jump signal, a system controller for controlling the correction ability of the error correction circuit based on the track jump signal, and an output circuit for outputting information data which has been subjected to the error correction process.

6 Claims, 7 Drawing Sheets

INFORMATION DATA TRANSFER SYSTEM

BACKGROUND OF THE INVENTION

This invention relates to an information data transfer system which can be applied to a reproducing device for an optical disk such as a CD (compact disk), and more particularly to a system for controlling the error correction ability based on occurrence of a track jump.

A CD which was originally used as an audio recording medium becomes more widely used by utilizing the feature of high-speed access and the large recording capacity of the optical disk and it is now applied not only in the field of music but also in the computer field and video field.

In a disk reproducing device, an EFM signal recorded on the disk is optically read by a pickup, the signal is amplified by an RF circuit, demodulated, de-interleaved and subjected to the correction process by a signal processing circuit, and then output as audio data or computer data. The above operations are controlled by a system controller. The signal processing circuit includes a PLL circuit, EFM demodulating circuit, subcode demodulation circuit, memory control circuit, memory, correction circuit and data output circuit.

A bit clock is extracted from the EFM signal in the PLL circuit, and the EFM demodulation and subcode demodulation are effected by use of the bit clock. In EFM data, one block which is called one frame is constructed by 588 bit clocks, and one symbol of subcode and 32 symbols of data are included in one frame. Among data which has been subjected to the EFM demodulation, one symbol of subcode is supplied to the subcode demodulating circuit and the 32 symbols of data are written into the memory by the memory control circuit and then corrected in the correction circuit.

In the CD system, an error correction code called CIRC (Cross Interleaved Reed-Solomon Code) is used. The feature of CIRC is that Reed-Solomon codes (C1, C2) of two stages which are combined in an interleaved form are used to enhance the correction ability.

In the series of C1 and C2, parities necessary for correction, that is, P-parity and Q-parity of four symbols are attached in the respective frames. That is, symbols of one-fourth of the 32 data symbols in total are used for correction.

First, based on the four symbols of the P-parity in the C1 series, correction of random errors occurring by jitter or interference between codes is made in the remaining 28 data symbols. In the next C2 series, a long-range interleaving process is effected for a maximum of 108 frames to cope with a long and large burst error which occurs when the synchronized operation is not attained because of malfunctioning of the disk reproducing device, the servo operation is disturbed, or a relatively large defect occurs on the disk.

The interleaving process can be easily realized by use of the memory.

The correction process is explained more in detail with reference to FIG. 1.

The number of symbols which can be corrected by use of the four symbols of the P-parity in the C1 series is up to two symbols. When correction of two symbols in the C1 series is made or when an error of three of more symbols occurs and cannot be corrected, a pointer is set in the frame. Then, correction is made again in the C2 series on the assumption that all of the symbols of the frame in the C1 series in which the pointer is set contain error factors. The number of symbols contained in the Q-parity used in the C2 series is four, but since the position of the error is almost determined by the pointer information set at the time of correction for the C1 series, a maximum of four symbols can be corrected.

As described above, the signal is restored with high fidelity by effecting the correction process twice for the C1 series and C2 series in the error correction circuit of the signal processing circuit. However, as shown in FIG. 2, since the C2 correction process is effected based only on the pointer information attached in the C1 series in the conventional system if a track jump occurs in the burst error of 16 frames occurring in the C1 series, data which is not originally required to be corrected is also subjected to the correction process. The track jump means that the pickup is moved to a different track by the influence of a scratch made on the disk while a certain track is being reproduced.

Therefore, there occurs a problem that the quadruplex correction ability used for effectively coping with occurrence of the long and huge burst error may adversely cause erroneous correction when the track jump has occurred.

BRIEF SUMMARY OF THE INVENTION

This invention has been made to solve the above problem and an object of this invention is to provide a data transfer system capable of preventing occurrence of erroneous correction when a track jump has occurred.

In order to attain the above object, an information data transfer system of this invention comprises a circuit for reading information data as reproduction data and subcode data and demodulating the read data; a circuit for subjecting the information data to the error correction process; a circuit for generating a track jump signal; a system controller for controlling the correction ability of the error correction circuit based on the track jump signal; and an output circuit for outputting information data which has been subjected to the error correction process.

With the above construction, the high correction ability can be normally used, but at the time of occurrence of a track jump which may cause erroneous correction with strong possibility, the erroneous correction caused by occurrence of the track jump can be prevented by lowering the correction ability preferably from the quadruplex correction level to the triplex correction level based on a track jump detection signal.

In a case where the above system is applied to a CD reproducing device, the circuit for reading and demodulating the information data preferably includes a PLL circuit for generating a PLL clock which is synchronized with an EFM signal and used for reading the EFM signal, and an EFM demodulating circuit for effecting the EFM demodulation and receiving the PLL clock to generate a reproduction frame frequency in which one frame corresponds to one clock, and the track jump signal generating circuit preferably includes a subcode demodulating circuit for receiving the reproduction frame frequency and subcode symbol from the EFM demodulating circuit, demodulating the subcode data, and outputting a track jump detection signal based on the result of demodulation.

Further, the subcode demodulation circuit preferably includes a 1/98 frequency-dividing counter for counting the number of frames to construct a subcode block by using the reproduction frame frequency output from the EFM demodulating circuit as a clock, a decoder for detecting count values of "96" and "97" of the 1/98 frequency-dividing counter and outputting an output signal, a sync detecting circuit for detecting subcode sync based on a subcode symbol output from the EFM demodulating circuit, and a track jump signal generating circuit for outputting a track jump signal based on the output timing of the subcode symbol and the detection timing of the subcode sync.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described an embodiment of this invention with reference to the accompanying drawings.

Figure 3:
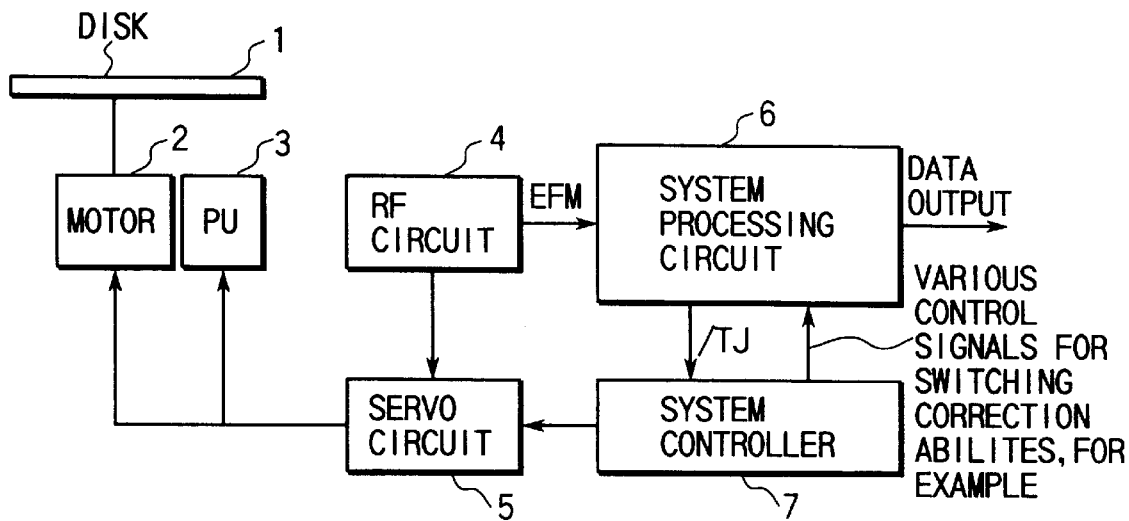
FIG. 3 is a block diagram showing a disk reproducing device according to one embodiment of this invention.

FIG. 3 is a block diagram showing a case wherein information data transfer system according to this invention is applied to a disk reproducing device.

In FIG. 3, a disk 1 such as a CD is driven and rotated by a disk motor 2. Data recorded on the disk 1 is read from the disk 1 which is rotated by means of an optical pickup (PU) 3. The read data is supplied to an RF circuit 4. The RF circuit 4 which is also referred to as an EFM signal generating circuit functions to extract a focus error signal and tracking error signal from an output of the optical pickup (PU) 3, supply the extracted signals to a servo circuit 5, binary-code a reproduction signal, and supply the binary-coded signal as an EFM signal to a signal processing circuit 6.

The signal processing circuit 6 effects the process for generating a clock used for reading an EFM signal, EFM demodulation process, subcode demodulation process, error correction process and the like and the output thereof is output as digital data. Further, the signal processing circuit 6 in this invention has a function of detecting a track jump and outputs a track jump detection signal /TJ to a system controller 7.

The system controller 7 outputs a setting signal for setting the correction ability to the signal processing circuit 6 based on the received track jump detection signal /TJ. Further, the system controller 7 supplies control signals used for controlling the whole system, for example, for controlling the play and stop operations and the operation for searching the interval between pieces of music and controlling the ON/OFF operation of muting to the signal processing circuit 6 and servo circuit 5.

Figure 4:
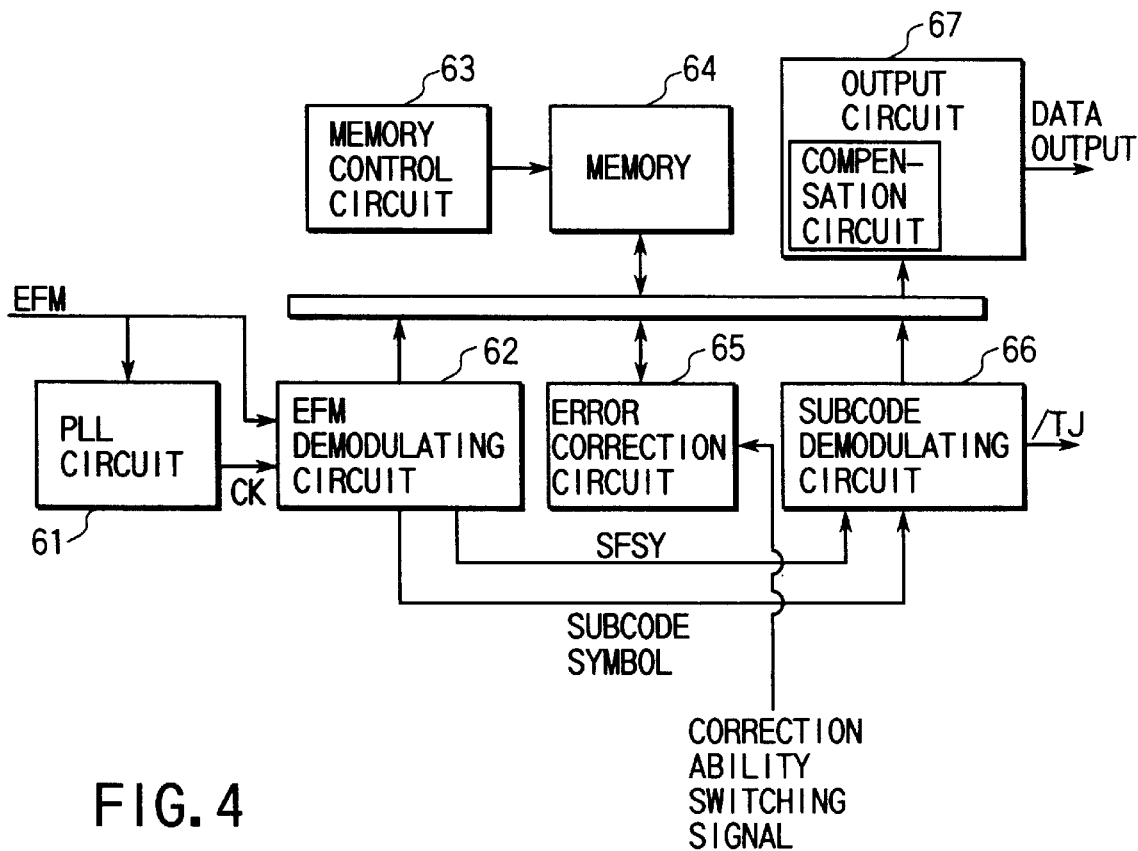
FIG. 4 is a block diagram showing a signal processing circuit.

The signal processing circuit 6 is explained more in detail with reference to FIG. 4.

A PLL circuit 61 generates a PLL clock which is synchronized with a EFM signal and used for reading the EFM signal and the PLL clock (CK) is supplied to an EFM demodulating circuit 62. After the EFM signal is separated from the sync signal by the EFM demodulating circuit 62, data of 33 symbols in total including subcode data of one symbol and data of 32 symbols containing parity data for each frame is subjected to the EFM demodulation process. Further, the EFM demodulating circuit 62 generates a reproduction frame frequency SFSY in which one frame corresponds to one clock.

The subcode data is supplied to a subcode demodulating circuit 66 and data of the remaining 32 symbols is written into a memory 64 by a memory control circuit 63.

The subcode demodulating circuit 66 receives the reproduction frame frequency SFSY and subcode symbol from the EFM demodulating circuit 62 and demodulates the subcode data. Further, it outputs a track jump detection signal /TJ.

Figures 5, 6:
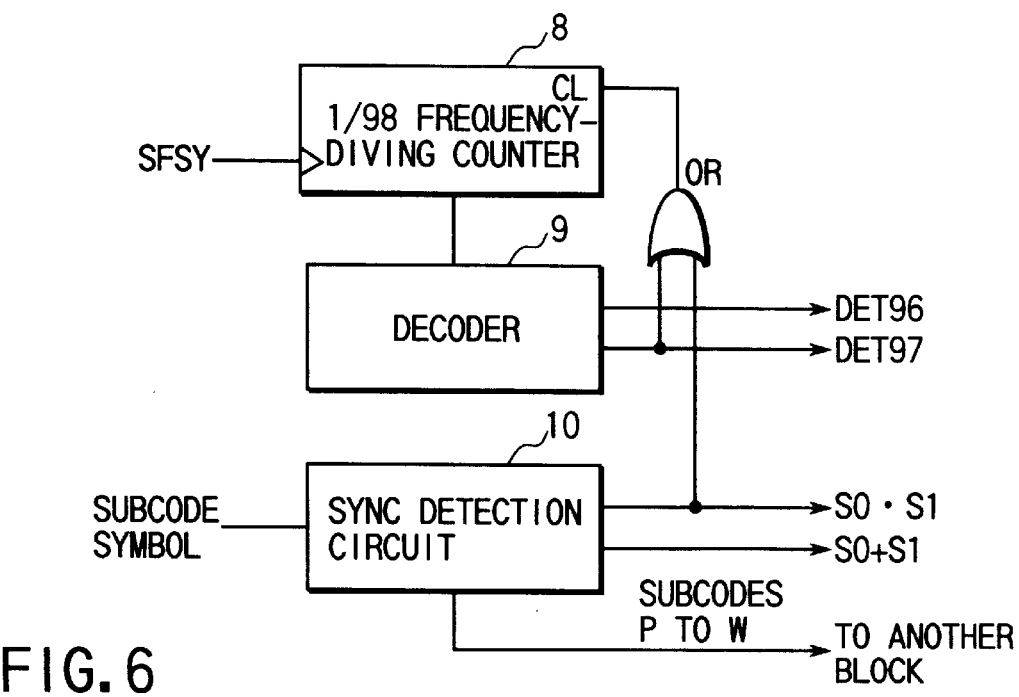
FIG. 5 is a construction diagram showing a subcode block.
FIG. 6 is a circuit diagram showing a track jump signal generating circuit.

As shown in FIG. 5, subcode symbols of 98 frames constitute one block and the subcode symbols come to have a special significance only when they constitute one block. The first two frames are subcode sync signals called S0, S1. P1 to P96 and Q1 to Q96 are used for access, six bits of R to W are used for special purposes such as the character representation of karaoke or still image.

The memory 64 is an interleave memory for jitter absorption and error correction. An output of the memory 64 is supplied to an error correction circuit 65 and subjected to the error correction process for the C1, C2 series. The initial setting level of the correction ability in the correction process is set at the quadruplex correction level, but when the track jump occurs at a preset frequency, the correction process is effected after the correction ability is lowered to the triplex correction level in response to an instruction from the system controller 7.

Then, data which has been subjected to the error correction process is read out from the memory 64 again and supplied to the output circuit 67.

Figure 7:
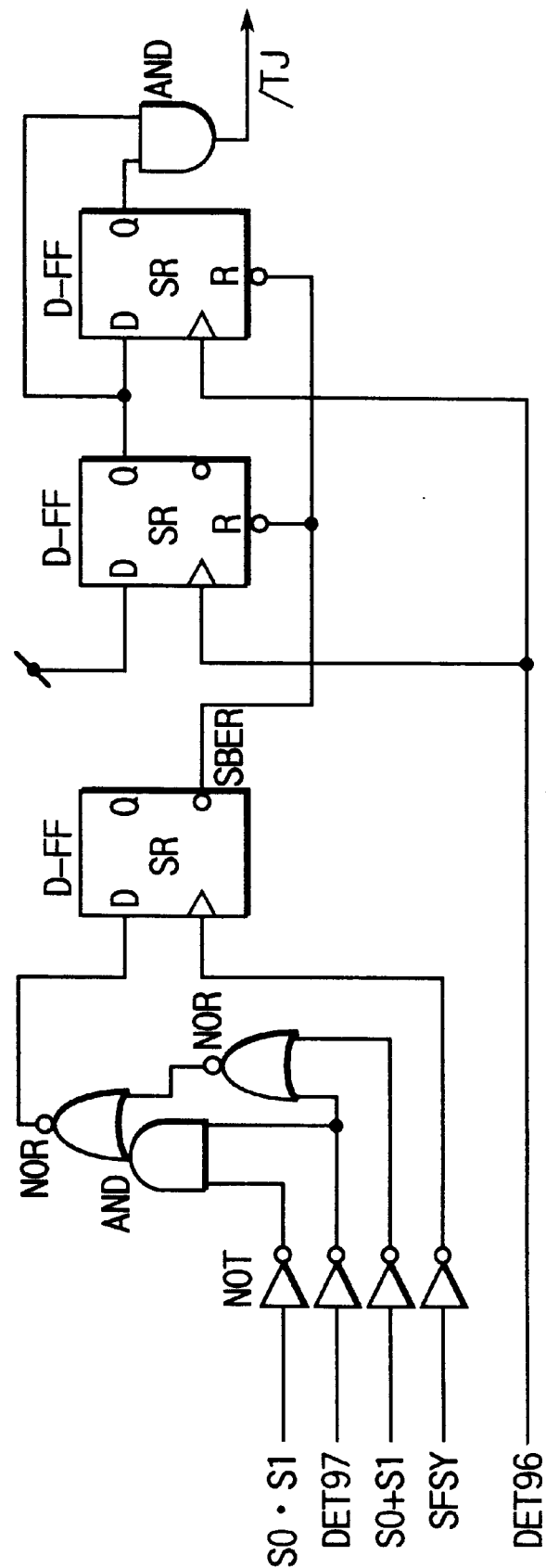
FIG. 7 is a circuit diagram showing a track jump signal generating circuit.

The circuit construction which is the main feature of this invention is shown in FIGS. 6 and 7 and explained more in detail.

A 1/98 frequency-dividing counter 8 shown in FIG. 6 counts the number of frames to construct a subcode block by using a reproduction frame frequency SFSY output from the EFM demodulating circuit 62 as a clock. A decoder 9 detects the count values "96" and "97" of the 1/98 frequency-dividing counter 8 and outputs DET96 and DET97. A sync detection circuit 10 detects a subcode sync signal from the subcode symbol output from the EFM demodulating circuit 62. An output S0·S1 is output when S0 and S1 are detected and an output S0+S1 is output when S0 or S1 is detected. Further, the subcodes P to W are subjected to the demodulation process in another block.

The 1/98 frequency-dividing counter 8 determines that the subcode sync signal is detected when DET97 or S0·S1 is detected and resets the count value to "0". Further, in a case where S0, S1 are correctly detected by the sync detecting circuit 10, S0·S1, and S0+S1 are synchronized with DET97 and generated at the same timing. Therefore, occurrence of a track jump can be detected by detecting the generation timings of the above outputs.

A circuit shown in FIG. 7 generates SBER indicating a subcode abnormal signal when the above generation timings are deviated from each other and outputs a track jump signal /TJ based on the abnormal signal. The subcode abnormal signal SBER is a signal which is set to "L" in a case where the decoder 9 does not detect the output signal DET97 when S0·S1 is generated or in a case where (S0+S1) is not generated when the decoder 9 detects the output signal DET97 and which is set to "H" in a normal case. Then, a signal which is reset by the subcode abnormal signal SBER used as a clear signal and which is set by the output signal DET96 from the decoder 9 is used as a track jump detection signal /TJ.

Figure 8:
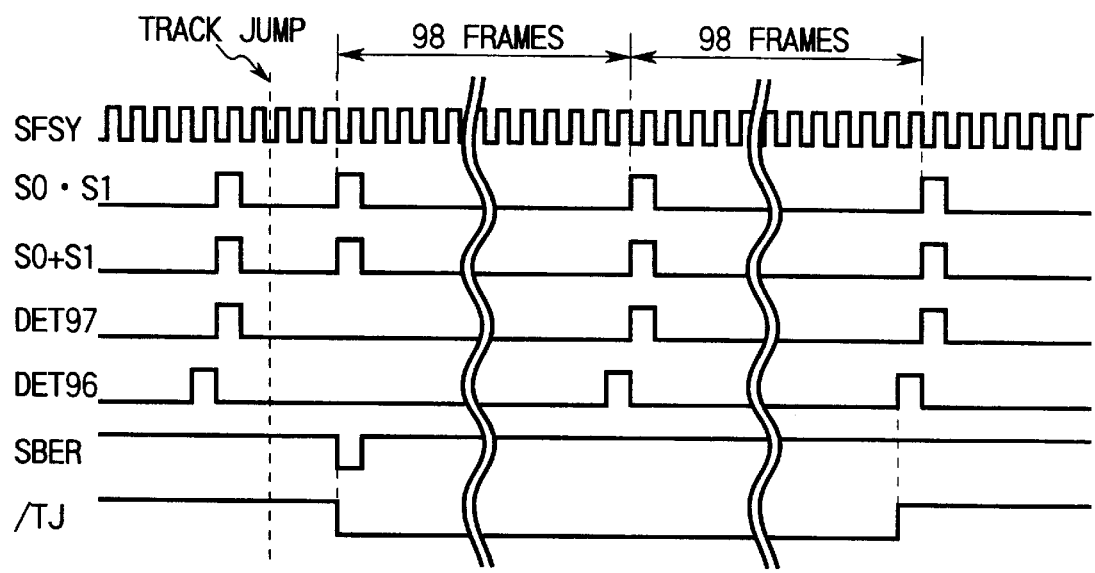
FIG. 8 is a timing diagram for illustrating the operation for generating a track jump signal.
Figure 9:
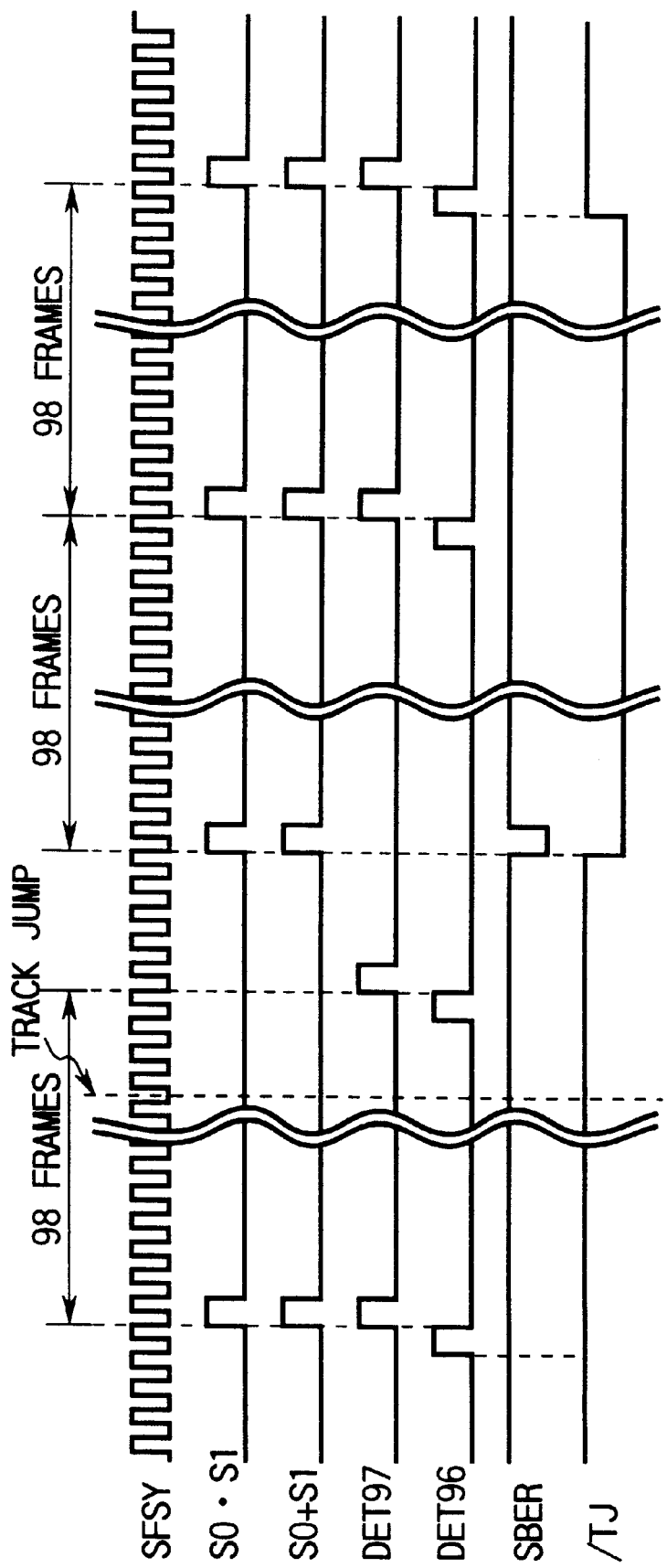
FIG. 9 is another timing diagram for illustrating the operation for generating a track jump signal.

FIGS. 8 and 9 are timing diagrams for illustrating a case wherein a track jump occurs. If a track jump occurs and a subcode pattern is not correctly read, detection timings of the count values (DET96, DET97) and generation timings of the subcode sync signals (S0, S1) do not correspond to each other. In a case of FIG. 8, since the subcode sync pattern S0·S1 is detected before the output signal DET97 is detected because of occurrence of a track jump, the subcode abnormal signal (clear signal) SBER is generated and a track jump detection signal /TJ is generated.

In a case of FIG. 9, since the subcode sync pattern S0·S1 is not detected because of occurrence of a track jump, the subcode abnormal signal (clear signal) SBER is generated and a track jump detection signal /TJ is generated.

The system controller 7 monitors the track jump detection signal /TJ and outputs a control signal for switching the C2 correction ability of the signal processing circuit 6 from the quadruplex correction level to the triplex correction level or lower correction level based on the fact that the signal /TJ is detected by a preset number of times N (N is a given value).

If the correction ability is set to the triplex correction level or lower correction level and when a track jump has occurred, the compensation process based on preceding and succeeding data items is effected instead of the error correction process because of the error correction algorithm so that the resultant sound will not be so unnatural in comparison with a case wherein the erroneous correction is made.

Next, a difference between the correction abilities of the quadruplex correction and the triplex correction in the C2-series correction process is explained in detail.

First, the parity includes four symbols in each of the C1 series and C2 series. Therefore, the minimum distance between codes indicating the error correction ability becomes "5", and the number of symbols which can be theoretically corrected in the C1 series is up to 2 and only the error detection can be effected for the three or four symbols. Further, in the correction process for the C2 series, the correction process is effected based on the algorithm which is exactly the same as that used in the correction process for the C1-series correction when the number of error symbols is 1 or 2.

However, in the correction process for the C2 series, three or four symbols can be corrected by utilizing information obtained as the result of correction in the C1 series. This is called erasure correction. In the erasure correction, a pointer is attached to each symbol on the assumption that all of the symbols in the C1 series contain errors if two or more error symbols are present in the C1 series. Then, in the correction process for the C2 series, the correction process is effected by treating the symbol to which the pointer is attached as an error symbol. As a result, up to four symbols can be corrected.

The algorithm of the erasure correction process is based on the following four equations (1) to (4) for deriving syndromes S0 to S3.

$$S0 = ei + ej + ek + el \quad (1)$$
$$S1 = \alpha^i ei + \alpha^j ej + \alpha^k ek + \alpha^l el \quad (2)$$
$$S2 = \alpha^{2i} ei + \alpha^{2j} ej + \alpha^{2k} ek + \alpha^{2l} el \quad (3)$$
$$S3 = \alpha^{3i} ei + \alpha^{3j} ej + \alpha^{3k} ek + \alpha^{3l} el \quad (4)$$

where e indicates an error vector, and α indicates an error location. Since the error location is detected by the error correction process already effected for the C1 series, an error vector can be obtained by deriving ei, ej, ek, el by use of the inverse matrix operation.

Then, the correcting operation is effected to obtain correct data based on D'i=Di+ei (D'i: one corrected symbol, Di: one reproduced symbol).

Figure 1:
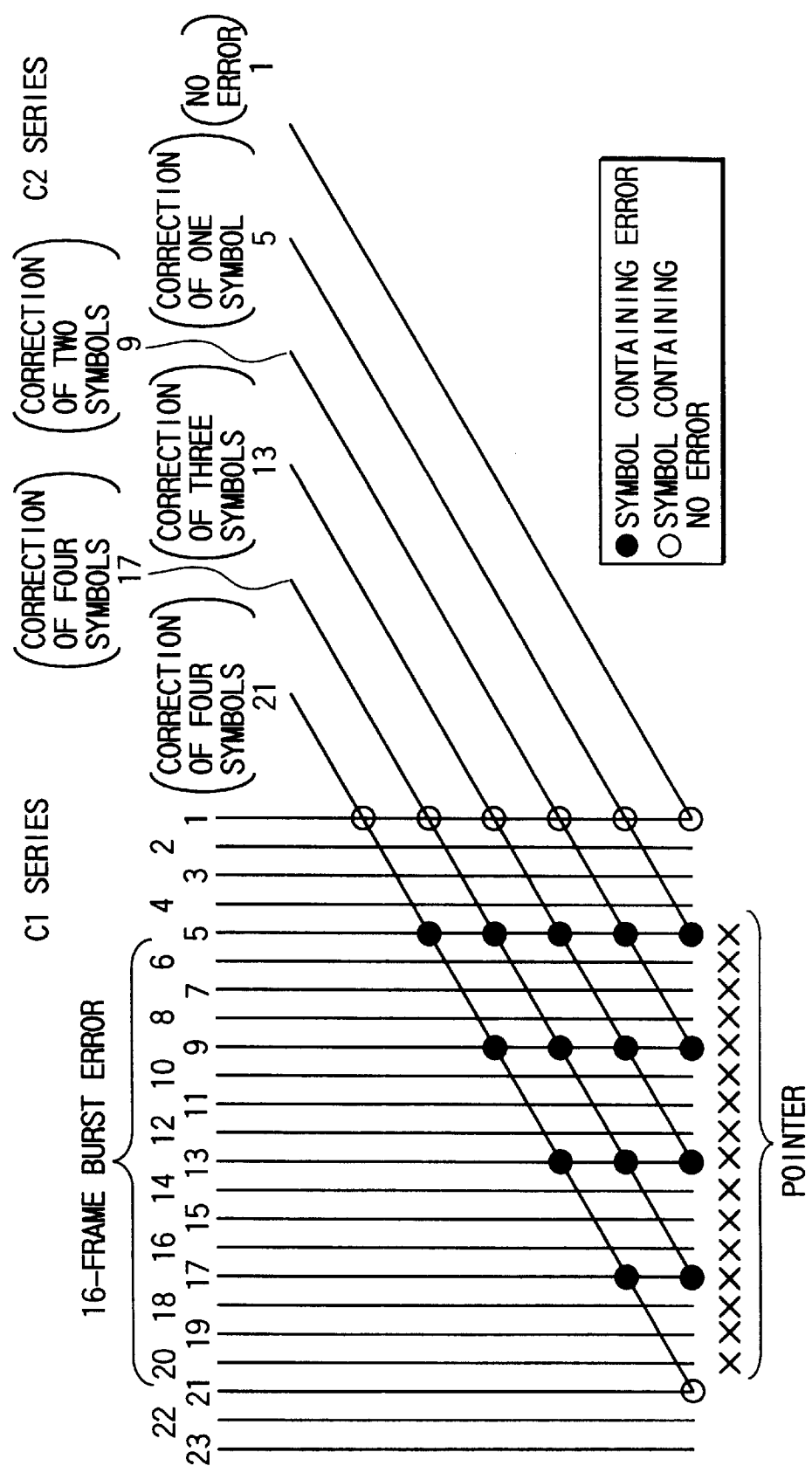
FIG. 1 is a conceptual diagram for illustrating the error correction process based on CIRC.
Figure 2:
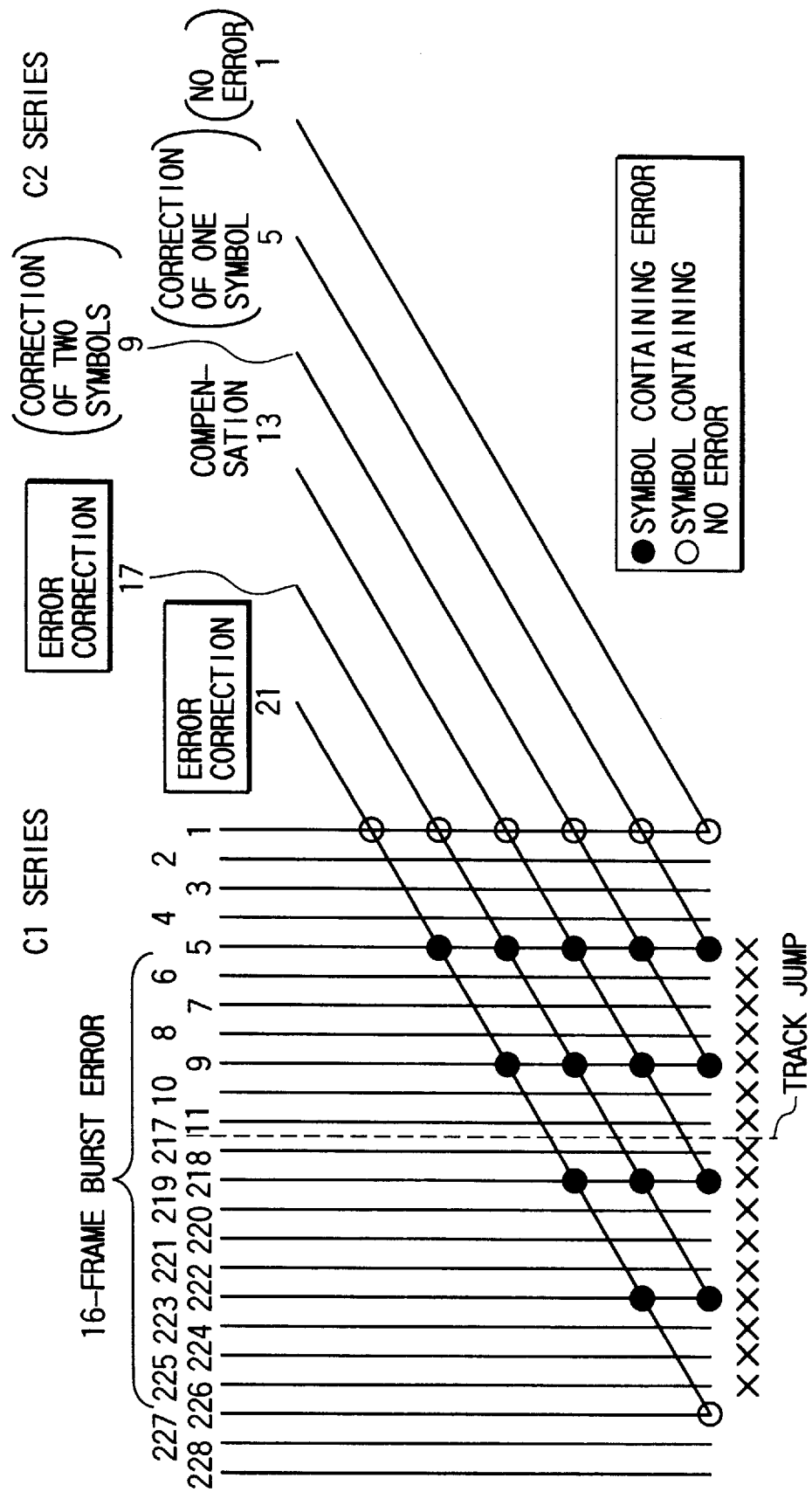
FIG. 2 is a conceptual diagram for illustrating an erroneous correcting operation caused by a track jump.

In the above quadruplex correction, since the process for deriving four unknown values is continuously effected while the symbols having the pointers attached thereto are treated as error symbols as they are even when a track jump has occurred as shown in FIG. 2, the possibility of erroneous correction becomes strong.

On the other hand, according to the triplex correction, three unknown values are derived by use of four equations. Therefore, one of the equations can be used for checking. Thus, the system controller 7 determines that the error correction cannot be made in a case wherein a burst error in which three or more pointers are attached has occurred and the process for compensating the error data based on the preceding and succeeding data items is effected by a compensation circuit for controlling.

In the case of quadruplex correction, error data will be adversely written by making the error correction when the truck jump has occurred, but according to the triplex correction, since the compensating process is effected instead of the error correction, the unnatural feeling on the aural sense can be significantly improved.

As described above, in this invention, the correction process for the C2 series is normally effected based on the quadruplex correction and the quadruplex correction level is changed to the triplex correction level or lower correction level to lower the possibility of erroneous correction when the error correction tends to occur in a case where track jump has occurred, for example.

According to this invention, a track jump detection signal is monitored by the external system controller, and when the signal is detected by a preset number of times, the C2 correction ability most suitable for the reproduction disk can be set to reduce the possibility of erroneous correction and significantly enhance the reliability of data. Further, the track jump detection signal can be generated and output to the exterior only by slightly changing the conventional circuit.

This invention is not limited to the above-described embodiment and can be variously modified without departing from the technical scope thereof.

For example, in the above embodiment, a disk reproducing device is used, but a data recording medium is not limited to a disk and may be a tape or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information data transferring system comprising;
   a circuit for reading information data as reproduction data and subcode data and demodulating the read data;
   an error correction circuit for subjecting the information data to an error correction process, said error correction circuit having a plurality of error correction abilities which can be applied to correct the read information data with different effect;
   a generating circuit for generating a track jump detection signal;
   a system controller for switching the error correction ability of the error correction circuit from one error correction ability to another error correction ability of said error correction circuit based on the track jump detection signal; and
   an output circuit for outputting information data which has been subjected to the error correction process.

2. A system according to claim 1, wherein said track jump signal generating circuit includes a circuit for detecting an abnormal state of subcode sync and a circuit for generating a track jump signal based on a subcode abnormal signal generated from said abnormal state detecting circuit.

3. A system according to claim 1, wherein said system controller lowers the correction ability in a C2-series correction process from a quadruplex correction level to a triplex correction level or lower correction level based on the fact that the track jump signal is detected by a preset number of times.

4. A system according to claim 3, further comprising a circuit for effecting a compensation process for the information data when it is determined that error correction of the information data cannot be made by said error correction circuit.

5. A system according to claim 1, wherein said information data reading and demodulating circuit includes a PLL circuit for generating a PLL clock synchronized with an EFM signal and used for reading the EFM signal and an EFM demodulating circuit for effecting the EFM demodulating operation and receiving the PLL clock to generate a reproduction frame frequency in which one frame corresponds to one clock, and said track jump signal generating circuit includes a subcode demodulating circuit for receiving the reproduction frame frequency and subcode symbol from said EFM demodulating circuit to demodulate subcode data and outputting a track jump detection signal based on the result of demodulation.

6. A system according to claim 1, wherein said subcode demodulating circuit includes a 1/98 frequency-dividing counter for counting the number of frames to construct a subcode block by using the reproduction frame frequency output from said EFM demodulating circuit as a clock, a decoder for detecting count values "96" and "97" of said 1/98 frequency-dividing counter and outputting an output signal, a sync detection circuit for detecting subcode sync based on the subcode symbol output from said EFM demodulating circuit, and a track jump signal generating circuit for generating a track jump signal based on the detection timing of the subcode sync.

* * * * *